March 1, 1960     A. A. READ     2,927,246
COUNTING CIRCUIT
Filed Feb. 27, 1956
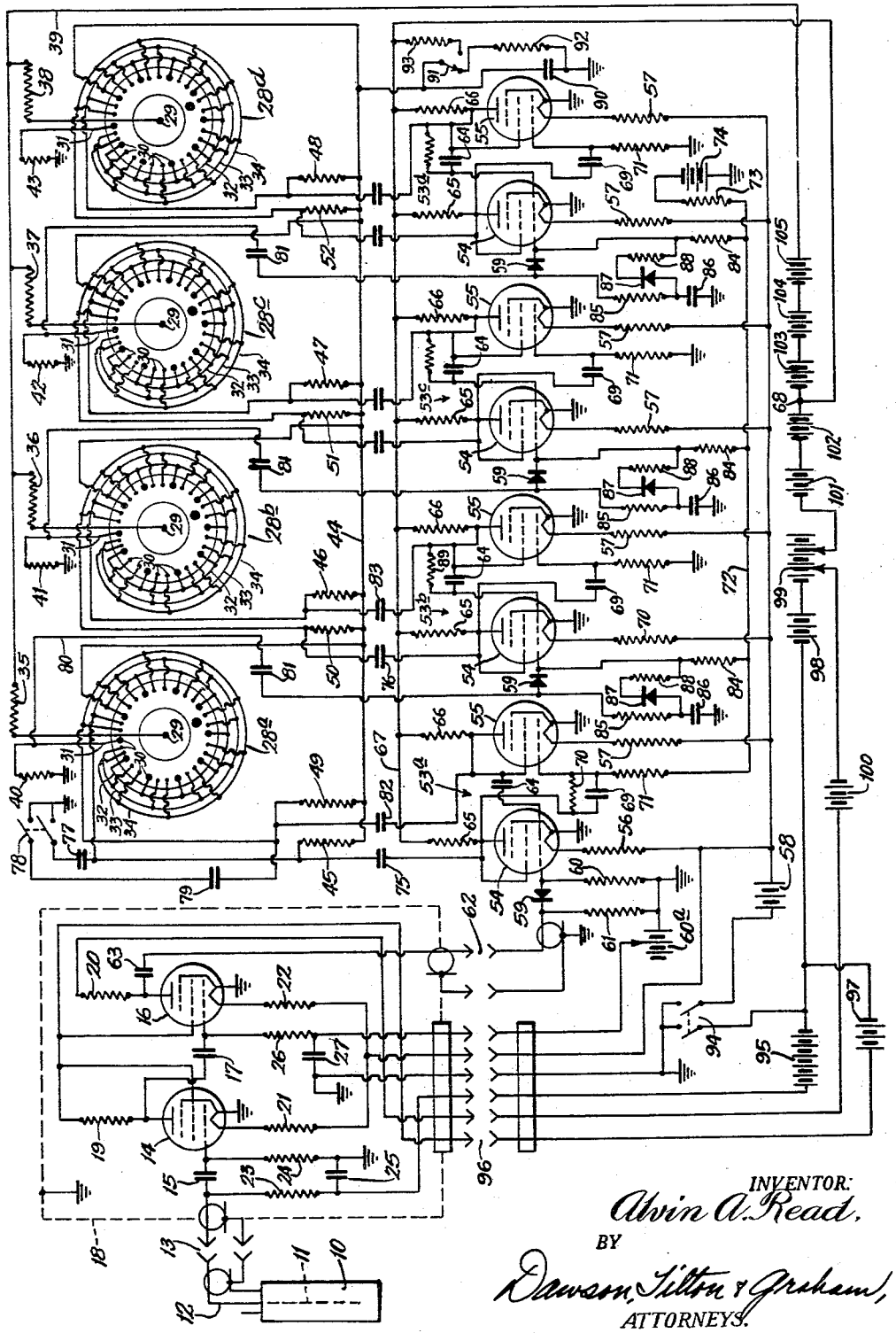
INVENTOR:
Alvin A. Read.
BY
Dawson, Tilton & Graham,
ATTORNEYS.

United States Patent Office 2,927,246
Patented Mar. 1, 1960

2,927,246

COUNTING CIRCUIT

Alvin A. Read, Ames, Iowa, assignor to Iowa State College Research Foundation, Inc., Ames, Iowa, a corporation of Iowa Application February 27, 1956, Serial No. 568,079

11 Claims. (Cl. 315—84.6)

This invention relates to a counting circuit, and more particularly to a circuit useful in making absolute count determinations of neutron captures made within a neutron counter tube. The circuit may be employed in conjunction with apparatus for measuring the moisture content of soil that utilizes neutron scattering techniques.

It is advantageous in many instances to be able to determine readily the moisture content of soil, and many devices and methods have been developed for measuring the moisture content of soil. Accurate determinations can be made in the laboratory where special equipment may be employed under closely controlled conditions. However, for the most part, apparatus heretofore developed for the measurement of the moisture content of soil for use in the field has not provided results having a high degree of accuracy. One of the difficulties is that the characteristics of soil vary from place to place, and the devices and techniques employed have not been successful in measuring the moisture content independently of the soil characteristics.

Recently, a neutron scattering technique has been developed for measuring the moisture content of soil. In this procedure, a fast neutron emitter or source of fast neutrons—a radium and beryllium emitter, for example—has been lowered beneath the surface of the soil to be tested and scatters fast neutrons through the soil thereabout. These neutrons collide with the hydrogen atoms of moisture contained in the soil, and through the elastic collisions lose a considerable portion of their kinetic energy and the speeds thereof are reduced to thermal velocities. A detector or counter tube is employed in conjunction with the emitter, and functions to capture the slow neutrons that are reflected back to the tube after their multiple impacts with the hydrogen atoms.

The neutron scattering technique is adapted to provide a relatively high degree of accuracy in the measurement of the moisture content of a soil. However, in order that the moisture content be ascertained independently of soil characteristics, it is essential that an absolute count determination be made of the slow neutrons captured by the detector tube. An absolute count may be contrasted with averages that have been provided by counting arrangements heretofore known. In order then that the neutron scattering techniques be utilized to the fullest in accurately determining the moisture content of a soil independently of the characteristics thereof, it is necessary that a counting means be provided wherein an absolute or accurate count of the neutron captures be made; and it is, accordingly, an object of this invention to provide such a means.

Another object of the invention is to provide a counting circuit useful in conjunction with neutron scattering apparatus for making moisture content determinations of a soil, and in which the number of slow neutrons detected per unit of time is a direct measure of the moisture content of the soil being tested. Still another object is in the provision of a counting circuit operatively associated with a slow neutron counting tube, and in which an automatic registration is made by the circuit of the absolute number of slow neutrons captured by the tube in a given unit of time.

A further object of the invention is in providing a counting circuit of the character described employing a plurality of glow transfer tubes arranged in a circuit so that count determinations are made automatically in terms of units, tens, hundreds, thousands, etc., the circuit being energized by each neutron captured by a detector tube. Still a further object is in the provision of a counting unit employing a quantity of glow transfer tubes, each of which is arranged in circuit with a univibrator— the univibrator of the first stage of the unit being set in operation by the capture of a slow neutron in a slow neutron detector tube associated with the unit, and the various stages being interrelated whereby when ten units are counted in the first stage, the second stage is energized and so forth through each of the stages. Yet a further object is to provide a counting circuit as described that is compact and light-weight, whereby it is exceptionally suited for use in portable neutron scattering devices, as soil moisture measuring apparatus, and to a substantial extent lends the portability feature thereto. Additional objects and advantages will become apparent as the specification develops.

An embodiment of the invention is illustrated in the accompanying drawing, in which the single figure is a schematic circuit diagram.

Looking first to the left side of the drawing, it is seen that the counting unit is arranged in combination with a detector tube that is designated with the numeral 10. The detector tube 10 may form a part of apparatus for determining the moisture content of soil. The tube 10 may be a slow neutron detector, such as a $B_{10}$ enriched boron-lined ionization tube. In a tube of this character, enriched boron coats the inner surface of the tube and provides a cathode surface for the ionization chamber. When slow neutrons are captured by the enriched boron lining of the tube, the $B_{10}$ nuclei disintegrate, and the fragments ionize the gas in the tube, thereby generating an electric current that appears at the anode 11 of the tube. A tube that may be used in conjunction with the counting unit and having the characteristics set forth, is commercially available and is known as a GE915977– G6 counter.

The current pulses appearing at the anode 11 are carried through a cable 12 and connector 13 to the control grid of a first amplifier tube 14 through a capacitor 15. The amplifier tube 14 comprises the first stage of a two-stage amplifier having also an electron discharge device or tube 16. The anode of the tube 14 is coupled to the control grid of the second amplifier tube 16 through a capacitor 17. The tubes 14 and 16, together with the various circuit components that comprise with the tubes a two-stage amplifier, are all encased in a shield 18. A shield 18 about the amplifier is desired for, preferably in using the counting unit, the amplifier stage comprises a portion of the probe unit along with the detector unit 10 and is placed in close proximity therewith. The shield 18 provides a considerable degree of mechanical protection for the amplifier unit.

The amplifier circuit comprises the usual anode resistors 19 and 20, heater resistors 21 and 22, and grid biasing elements, such as the resistor 24 associated with the tube 14, and resistor 26 and capacitor 27 associated with the tube 16. The two-stage amplifier is substantially conventional and functions in a manner well known in the art. It is believed, therefore, that a further description of the amplifier is unnecessary and will not be set forth. The anode 11 of the tube 10 is connected to a battery power source through resistor 23 and to ground through capacitor 25.

The counting unit also includes a plurality of counting tubes 28. In the specific circuit shown, four counting tubes are provided and, for purposes of identification, these are designated respectively with the numerals 28a through 28d. These tubes are all identical and are known in the art as glow transfer tubes. A commercial tube of this type is available under the identification number GS10C. As will be brought out in greater detail hereinafter, the counter tubes 28a through 28d are arranged respectively to count units, tens, hundreds, and thousands.

The counter or glow transfer tubes have an anode 29 and a plurality of spades 30. In the specific glow transfer tubes employed in the embodiment of the invention illustrated, there are thirty spades, and with the exception of one of the spades (which is designated with the numeral 31), the spades are arranged so that every third one thereof is connected together, whereby three spade groups 32, 33 and 34 are provided. The glow transfer tubes are gaseous tubes and have the characteristic of providing a glowing discharge between the anode 29 and any one of the spades. These tubes further have the characteristic of always making an effort to move the glow path from between the anode and any given spade to an adjacent spade having a lower voltage than the one that the glow path extends to.

That is to say, if a glow transfer extends between the anode and the spade 31, for example, and the potential at the spade adjacent the spade 31 is reduced to a lower voltage than the one being applied to the spade 31, the glow transfer will shift from the spade 31 to the one next thereto having the lower voltage. With the arrangement shown wherein three separate spade groupings are provided, the circuit arrangement is such that the glow transfer will shift from one grouping of three spades to the grouping adjacent thereto, so that in each of the glow transfer tubes ten separate glow transfer paths are provided.

The anodes of each of the glow transfer tubes are connected, respectively, through resistors 35, 36, 37 and 38 to the B plus line 39. The spades 31 of each of the tubes is grounded, respectively, through the resistors 40, 41, 42 and 43. The spade group 32 of each tube is connected directly to a common line 44, while the groups 33 are each connected, respectively, to the common line 44 through resistors 45, 46, 47 and 48, and each group 34 is connected to the common line 44 through resistors 49, 50, 51 and 52. Spade 31 and spade group 32 can properly be called cathode spade 31 and cathode spade group 32, respectively.

Operatively associated with each of the glow transfer tubes is a pulsing network or pulse generating network 53, there being four in number, and these networks are designated, respectively, with the numerals 53a through 53d. More specifically, each of the pulsing networks comprises a univibrator having two electron tubes 54 and 55. Each of the tubes 54 and 55 may be a CK522AX. These tubes are direct heater tubes with one side of the filament grounded, and the other side connected, respectively, through resistors 56 and 57 to a source of heater current such as a battery 58 that may provide one and one-half volts. The control grid of each of the input tubes 54 is connected to a crystal diode 59 which may be a 1N38A. In the network 53a, the control grid of tube 54 is returned to ground through resistor 60.

The diode 59 of network 53a is connected through a plug 62 and coupling capacitor 63 with the anode of the amplifier tube 16. The plug 62, or outer shield thereof, is grounded as is shown in the drawing. Amplified pulses appearing at the anode of the second amplifier tube 16 are thereby imposed through the crystal diode 59 onto the control grid of the input tube 54 of the univibrator, and serve to trigger the univibrator or pulsing network 53a.

The grid of the tube 54 of the network 53a is connected through a capacitor 64 to the screen grid of the tube 55 and also to the anode of that tube. The anodes of the tubes 54 and 55 of each of the networks is connected through anode resistors 65 and 66, respectively, to a common line 67 that is connected to a power source at the point 68 so as to provide the anode voltage for the univibrator tubes. This anode voltage is preferably about 180 volts D.-C.

The anode of each of the tubes 54 is coupled to the control grid of the respective tubes 55 by a capacitor 69, and in the network 53a, a resistor 70 is also included therebetween. The control grid of the tube 55 in network 53a is connected through a resistor 71 to a line 72 that in turn is connected through a resistor 73 to the negative side of a battery 74 having a positive side thereof grounded. The battery 74 is adapted to provide a biasing voltage of about 67½ volts for such tubes. In the remaining networks, the control grids of the tubes 54 are connected to the line 72 and the control grids of the tubes 55 are grounded through the resistances 71.

The anode of the tube 54 in the network 53a is connected through a capacitor 75 to the group 33 of spades in the glow transfer tube 28a. Each of the tubes 54 in the networks 53b, 53c and 53d is connected through a capacitor 76 to the group 34 of spades of the respective glow transfer tubes 28b through 28d. In addition, the anode of the tube 54 through the capacitor 75 is connected through a further capacitor 77 to one of the poles of a double-pole, single-throw switch 78, and the other pole thereof being connected through capacitor 79 with the group of spades 34 of the glow transfer tube 28a. The opposite contacts of the switch 78 are connected to ground. The switch 78 is the count-stop switch of the circuit, and terminates the counting action of the glow transfer tubes whenever the switch is closed, and initiates counting of those tubes whenever the switch is opened.

The cathode spade 31 of each of the glow transfer tubes, through a line 80 and capacitor 81, is connected to the anode or input side of the crystal diode 59 of each of the following stages. More specifically, the cathode spade 31 of the glow transfer tube 28a feeds into the control grid of the tube 54 of the network 53b, the glow transfer tube 28b and its cathode spade 31 feeds the control grid of the tube of the network 53c, and so forth. The cathode spade 31 of the last glow transfer counter 28d is simply grounded through the resistor 43, but it should be appreciated that additional counting stages might be provided, and in such case the cathode space 31 of that glow transfer tube would be coupled to the control grid of the input tube in a subsequent univibrator network.

The anode of the tube 55 in the network 53a is connected through a capacitor 82 to the spade group 34 of the glow transfer tube 28a, while the anodes of the tubes 55 in each of the subsequent pulsing networks is connected through a capacitor 83 to the spade grouping 33 of the glow transfer tubes 28b through 28d.

The control grid of each of the input tubes 54 of the networks 53b through 53d, as mentioned heretofore, are connected to the biasing line 72 through a resistor 84. The input side of the crystal diode 59 is connected to the control grid of each of those tubes is returned to ground through a resistor 85 and capacitor 86. The control grid is also connected to the common point between the resistor 85 and capacitor 86 by a crystal diode 87 and resistor 88. The crystal diodes 87 may be 1N38A's.

It has been brought out hereinbefore that the control grid of each tube 54 in the networks 53b to 53d are coupled to the anode of the tube 55 in each of those networks through a condenser 64. In each of these stages, the capacitor or condenser 64 is shunted by a resistor 89. As is seen at the right-hand side of the drawing, the common line 44 is connected to ground through a capacitor 90 that is adapted to have placed in shunt or parallel therewith through a two-position switch 91, a resistor 92. The switch 91 is also adapted, when swung into its other position, to be connected to one side of a resistor 93 having the other side thereof connected to the common line 67. The switch 91 is the reset switch, and when depressed functions to transfer the glow of each of the glow transfer tubes to the starting or zero position in preparation to conditioning the circuit for a subsequent counting operation.

A power switch 94 is shown at the left bottom of the drawing, and provides the on/off switch for the entire counting circuit. This switch is a double-pole, single-throw switch—one pole thereof serves to connect the one and one-half volt heater battery 58 to the tubes 14, 16, 54 and 55 of the amplifier and counting circuit; the other pole serves to complete the return path to ground of the other batteries in the circuit. All of the battery connections are shown in the drawing, and are substantially conventional and well known in the art. Therefore, it is believed that a detailed description of these batteries and their connections—which is apparent from an inspection of the drawing—need not be set out; but for convenience, the batteries will be numerically designated with their voltage values, as follows: Battery 95 provides 620 volts; battery 97—22½ volts; battery 98—22½ volts; battery 99—7½ volts; batteries 100 and 101 each provides 67½ volts; batteries 102, 103, 104 and 105 each provide 90 volts; and battery 74, as heretofore described, provides 67½ volts. The battery 99 is tapped so that adjustment can be made to compensate for diminution in voltage that will occur through use of the apparatus, whereby relatively uniform voltages may be maintained. The connector 96 couples the probe unit to the power supply.

It will be appreciated that the D.C. voltage sources shown and described, i.e., batteries, may be replaced with other power sources either completely or in part, or for example, a vibrator type power pack. In some cases, such a change would be an advantage in that it would decrease the weight of the apparatus and thereby lend to the portability thereof.

*Operation*

In use of the counting circuit, the input of the first amplifier 14 is connected to a source of voltage pulses. The source may be a counter tube of the type described, and each pulse provided thereby is impressed upon the control grid of the first amplifier and is amplified in each of the stages or tubes 14 and 16 of the amplifier. The negative pulse of amplied character is coupled to the crystal diode 59 through the capacitor 63 connected to the anode of the second amplifier tube.

In the univibrator stage 53a, the tube 54 is zero biased and normally conducts while the tube 55 is normally cut off. The pulse impressed on the control grid of the univibrator tube 54 cuts off this tube, and a positive pulse of generally square shape appears at the anode thereof, and through the time-constant capacitor and resistor 69 and 70 is fed to the control grid of the tube 55 whereby that tube conducts and a negative pulse of generally square shape is fed to the counter tube 28a. Prior to the operation that has been described so far, the power switch 94 has been closed to energize the counting circuits, the counting tubes 28a through 28d have all been restored to starting condition wherein no counts are recorded by movement of the switch 91, and the counting circuits have been conditioned to start a counting cycle by closure of the switch 78. The counting tubes or glow transfer tubes will at this time each show a zero count.

When a pulse is delivered by the network 53a to the spade groups 33 and 34 of tube 28a, the glow discharge path will be moved from the zero count position to the cathode spade that indicates or designates a one count. In an actual embodiment of the device, the glow transfer tubes have the upper surfaces thereof exposed through the panel of the housing or casing for the device, and the various cathode spade positions will be enumerated so that the operator can glance at the tubes and read directly in numerical terms the number of counts that have been made by each of the tubes. This cycle of operation will continue each time that a pulse is delivered to the tube 28a by the network 53a.

After nine counts have been received by the unit counter tube 28a, the next count recorded thereby will shift the glow discharge path to the cathode spade 31 which is coupled to the control grid of the tube 54 of the network 53b. The tube 54 in that network is normally cut off and the tube 55 is normally conducting. The pulse delivered to the network 53b by the cathode spade 31 of the unit counter tube 28a causes a pulse to be delivered to the tube 28b, and the glow discharge path of that tube will shift from the zero indicating position to the number one indicating position. The tube 28b counts tens and, then, at that moment the tubes 28b and 28a will register respectively, one and zero, or a total of ten counts.

This procedure is continued repetitiously, and for each ten pulses delivered to the tube 28a one pulse will be delivered to the tube 28b, and so forth, until ten pulses have been recorded by the tube 28b. At such time the glow discharge path will move to the cathode spade 31 of that tube, which is coupled to the control grid of the tube 54 in the network 53c, and that network will deliver a pulse to the counter tube 28c, and the circuit will then indicate a count of 100. When the tube 28c has recorded ten counts, the network 53d will deliver a pulse to the tube 28d which counts thousands. In the embodiment illustrated and described, the apparatus is arranged to count from 1 to 9,999. Additional counting stages may be provided, and each stage will comprise a glow transfer tube and a univibrator. The important consideration in use of the device is the number of counts recorded in a given time. The operator then at a predetermined moment closes the switch 78 and keeps it closed for a certain period, and at the expiration of such period opens the switch 78 to terminate the recordation of counts by the apparatus. Generally, a count of about 5,000 will be obtained in around thirty seconds when the circuit is used for the detection of moisture in soil. The operator then need only watch a timing device, and to determine the number of counts made in a selected time interval he simply reads the total number of counts directly from the apparatus.

The circuit functions to record each and every pulse fed to the amplifier, and the only recordations made are when pulses are delivered to the amplifier. That is, the univibrator networks deliver a single pulse of predetermined character for each pulse delivered thereto through the amplifier. Thus, the counter accurately counts the exact number of pulses received in a unit of time in contrast to averages that are indicated in devices heretofore employed. After a count reading has been made, the circuit is returned to normal by changing the reset switch 91 to its alternate position.

The electron discharge tubes employed in the univibrator circuits and in the amplifier unit are of the subminiature hearing aid type, whereby the compactness of the device is considerably enhanced and portability facilitated. Further, the counter is quite sensitive and provides an absolute count determination while operating at a very low power level. The circuit obviates to a substantial extent considerations concerning absolute gains, drift, threshold noise levels, etc.

While in the foregoing specification an embodiment of the invention has been described in substantial detail for the purpose of completely describing the invention in an environmental setting, it will be appreciated that numerous changes may be made in these details by persons skilled in the art without departing from the spirit and principles of the invention.

I claim:

1. In an impulse counting circuit, a counter tube, a univibrator, a pulse shaping network connecting the output of said univibrator and the input of said counter tube, and means for feeding trigger signals to the input of said univibrator.

2. The structure of claim 1, in which the said pulse shaping network is a resistance capacitor network.

3. The structure of claim 1, in which said means includes a crystal diode.

4. In an impulse counting circuit, a glow transfer counter tube adapted to provide a glow discharge between predetermined points, the points corresponding to the number of pulses fed to said tube, a single source for said pulses comprising a univibrator, a resistance capacitance network coupling said univibrator to said tube, and input means to said univibrator for feeding impulses thereto.

5. The structure of claim 4 in combination with at least one other like impulse counting circuit, the counter tube of one circuit being connected to the univibrator of another circuit.

6. The structure of claim 4 in which the resistance capacitance network is equipped with switches, one for initiating and terminating selectively a counting cycle, and another for returning said counter tube to a zero counting condition.

7. In an impulse-counting circuit, a plurality of counter tubes adapted to provide an indication of the number of pulses fed thereto, a pulse generator network for each of said counter tubes, each network being functional to develop a pulse of predetermined character at the output thereof when a trigger pulse is fed to the input thereof and being the sole source of pulses for its associated counter tube, and circuit means interconnecting the counter tubes with the respective pulse generator networks and each counter tube with the input of the succeeding pulse generator network, said circuit being arranged to count units, tens, ad seriatim.

8. The structure of claim 7, in which each of said pulse generator networks comprises a univibrator.

9. The structure of claim 8, in which each of said univibrators comprises a pair of electron discharge devices, a crystal diode being provided in the input of each univibrator for coupling pulses thereto.

10. The structure of claim 7, in which said circuit means are equipped with switches, one for initiating and terminating selectively a counting cycle and another for returning each of said counter tubes to a zero counting condition.

11. In an impulse-counting circuit, a plurality of glow transfer tubes each providing a plurality of glow transfer paths indicative respectively of the number of pulses counted by the tubes, a plurality of univibrator pulsing networks, one for each of said glow transfer tubes and being adapted to provide at the outputs thereof a pulse of predetermined character for a trigger pulse fed to the inputs thereof, circuit means including resistance capacitance means coupling each network with its respective glow transfer tube and for coupling each glow transfer tube with the network next following, input means for feeding trigger pulses to the first univibrator pulse network, the first glow transfer tube being connected to the input of the second univibrator network for feeding a trigger pulse thereto after a predetermined number of counts has been made by that tube, the second glow transfer tube being connected to the following vibrator pulse network for feeding a trigger pulse thereto following a predetermined number of counts by that tube, and a pair of switches interposed in said circuit means for initiating and terminating selectively a counting cycle and for returning each of said glow transfer tubes to a zero counting condition.

References Cited in the file of this patent

UNITED STATES PATENTS

| | | |
|---|---|---|
| 2,651,741 | Koehler | Sept. 8, 1953 |
| 2,766,376 | Maynard | Oct. 9, 1956 |